(12) United States Patent
Leahy et al.

(10) Patent No.: US 7,415,017 B2
(45) Date of Patent: Aug. 19, 2008

(54) SECURITY THROUGH MANIPULATION OF VIRTUAL TOPOGRAPHY

(76) Inventors: T. Liam Leahy, 25 Greystone Manor, Lewes, DE (US) 19958-9776; Eric Coley, 59 Coolidge Rd., Norwell, MA (US) 02061

( * ) Notice: Subject to any disclaimer, the term of this patent is extended or adjusted under 35 U.S.C. 154(b) by 927 days.

(21) Appl. No.: 10/623,210

(22) Filed: Jul. 18, 2003

(65) Prior Publication Data
US 2005/0013324 A1    Jan. 20, 2005

(51) Int. Cl.
    *H04L 12/28* (2006.01)
(52) U.S. Cl. .................................... 370/392; 370/400
(58) Field of Classification Search ............ None
    See application file for complete search history.

(56) References Cited

U.S. PATENT DOCUMENTS

| | | | |
|---|---|---|---|
| 6,430,183 B1 * | 8/2002 | Satran et al. ............... | 370/389 |
| 6,570,885 B1 * | 5/2003 | Gregg ....................... | 370/428 |
| 6,693,878 B1 * | 2/2004 | Daruwalla et al. ........... | 370/235 |
| 6,721,335 B1 * | 4/2004 | Gregg ....................... | 370/473 |
| 6,748,452 B1 * | 6/2004 | Elphinstone et al. ......... | 719/310 |
| 7,010,590 B1 * | 3/2006 | Munshi ...................... | 709/224 |
| 7,127,255 B2 * | 10/2006 | Hsu et al. ................. | 455/452.2 |
| 7,155,494 B2 * | 12/2006 | Czeiger et al. ............. | 709/218 |
| 2001/0034844 A1 * | 10/2001 | Bellovin .................... | 713/201 |
| 2002/0133496 A1 * | 9/2002 | Fujisaki ..................... | 707/100 |
| 2003/0131105 A1 * | 7/2003 | Czeiger et al. ............. | 709/225 |
| 2004/0010618 A1 * | 1/2004 | Thomas ...................... | 709/245 |
| 2004/0086000 A1 * | 5/2004 | Wallace et al. .............. | 370/503 |

* cited by examiner

*Primary Examiner*—Andrew Lee
(74) *Attorney, Agent, or Firm*—Fish & Associates, PC

(57) ABSTRACT

Methods and apparatus are disclosed for improving network security through the manipulation of the apparent topology of the network. Such manipulation is accomplished by assigning multiple identifiers to nodes, using different destination identifiers for packets being sent to the same destination, and using source identifiers that do not correspond to the identifiers of the node sending the packets.

1 Claim, 5 Drawing Sheets

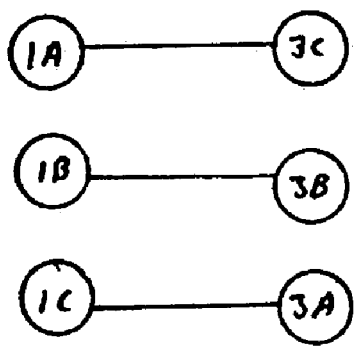
Fig. 1E
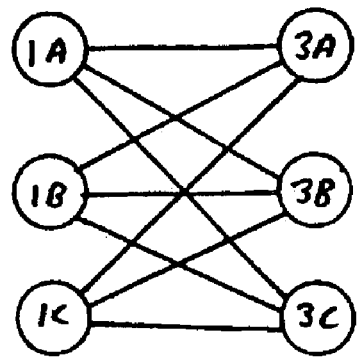
Fig. 1F
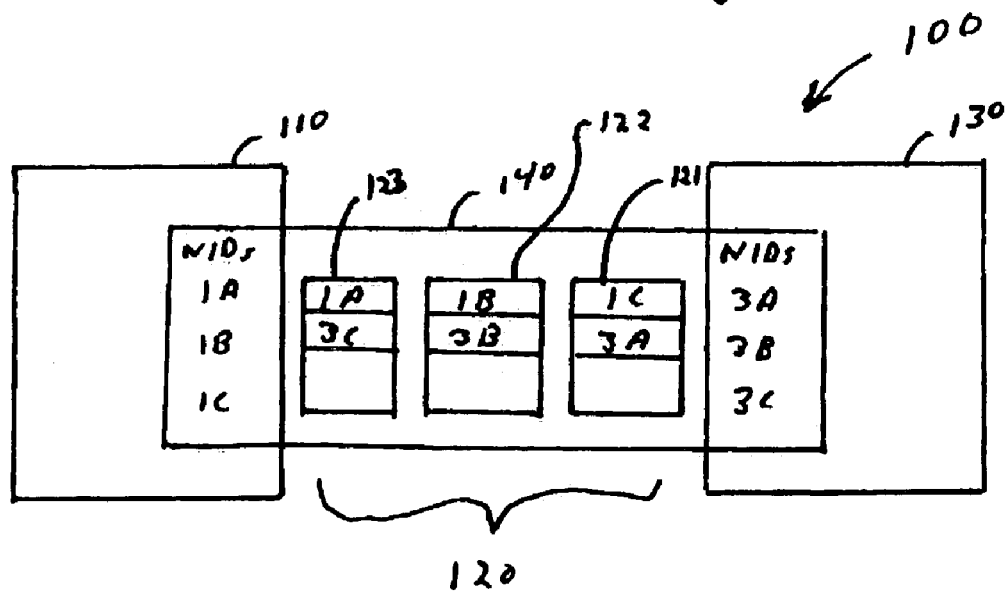
Fig. 1G
| Packet No. | Source Node | Dest. Node | NID (Source) | SID (Packet) | DID (Packet) |
|---|---|---|---|---|---|
| 121 | 110 | 130 | 1A | 1A | 3C |
| 122 | 110 | 130 | 1A | 1B | 3B |
| 123 | 110 | 130 | 1A | 1C | 3A |
Fig. 1H

| Packet No. | Source Node | Dest. Node | NID (Source) | SID (Packet) | DID (Packet) |
|---|---|---|---|---|---|
| 121 | 110 | 130 | 1A | 1A | 3A |
| 122 | 110 | 130 | 1A | 1A | 3B |
| 123 | 110 | 130 | 1A | 1A | 3C |
| 123 | 110 | 130 | 1B | 1B | 3A |
| 125 | 110 | 130 | 1B | 1B | 3B |
| 126 | 110 | 130 | 1B | 1B | 3C |
| 127 | 110 | 130 | 1C | 1C | 3A |
| 128 | 110 | 130 | 1C | 1C | 3B |
| 129 | 110 | 130 | 1C | 1C | 3C |
Fig. 1I
Fig. 1J
Fig. 1K
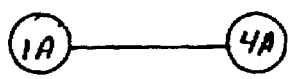
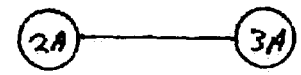
Fig. 1L
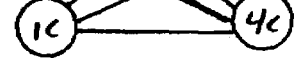
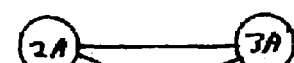
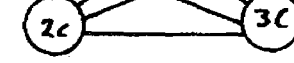
Fig. 1M

| Packet No. | Source Node | Dest. Node | NID (Source) | SID (Packet) | DID (Packet) | NID (Dest.) |
|---|---|---|---|---|---|---|
| 121 | 110 | 130 | 1A, 1B, or 1C | 2A | 3A | 3A |
| 122 | 110 | 130 | 1A, 1B, or 1C | 2B | 3B | 3B |
| 123 | 110 | 130 | 1A, 1B, or 1C | 2C | 3C | 3C |
| 124 | 130 | 110 | 3A, 3B, or 3C | 4A | 1A | 1A |
| 125 | 130 | 110 | 3A, 3B, or 3C | 4B | 1B | 1B |
| 126 | 130 | 110 | 3A, 3B, or 3C | 4C | 1C | 1C |

| Packet No. | Source Node (NID: 211) | Dest. Node (NID: 234) | Seg. 241 SD Pair (Orig. Packet) | Seg. 242 SD Pair (Enc. Packet) | Seg. 243 SD Pair (Enc. Packet) | Seg. 244 SD Pair (Orig. Packet) |
|---|---|---|---|---|---|---|
| 1 | 211 | 234 | (211,234) | (2A,3A) | (6A,7A) | (211,234) |
| 2 | 211 | 234 | (211,234) | (2A,3B) | (6A,7B) | (211,234) |
| 3 | 211 | 234 | (211,234) | (2A,3C) | (6A,7C) | (211,234) |
| 4 | 211 | 234 | (211,234) | (2B,3A) | (6B,7A) | (211,234) |
| 5 | 211 | 234 | (211,234) | (2B,3B) | (6B,7B) | (211,234) |
| 6 | 211 | 234 | (211,234) | (2B,3C) | (6B,7C) | (211,234) |
| 7 | 211 | 234 | (211,234) | (2C,3A) | (6C,7A) | (211,234) |
| 8 | 211 | 234 | (211,234) | (2C,3B) | (6C,7B) | (211,234) |
| 9 | 211 | 234 | (211,234) | (2C,3C) | (6C,7C) | (211,234) |
| 10 | 234 | 211 | (234,211) | (4A,1A) | (8A,5A) | (234,211) |
| 11 | 234 | 211 | (234,211) | (4A,1B) | (8A,5B) | (234,211) |
| 12 | 234 | 211 | (234,211) | (4A,2C) | (8A,5C) | (234,211) |
| 13 | 234 | 211 | (234,211) | (4B,1A) | (8B,5A) | (234,211) |
| 14 | 234 | 211 | (234,211) | (4B,1B) | (8B,5B) | (234,211) |
| 15 | 234 | 211 | (234,211) | (4B,1C) | (8B,5C) | (234,211) |
| 16 | 234 | 211 | (234,211) | (4C,1A) | (8C,5A) | (234,211) |
| 17 | 234 | 211 | (234,211) | (4C,1B) | (8C,5B) | (234,211) |
| 18 | 234 | 211 | (234,211) | (4C,1C) | (8C,5C) | (234,211) |

| Time Block | Packet No. | SD Pair |
|---|---|---|
| 1 | 1 | (1A, 2B) |
| 1 | 2 | (1C, 2A) |
| 1 | 3 | (1A, 2C) |
| 1 | 4 | (1B, 2B) |
| 1 | 5 | (1C, 2C) |
| 2 | 6 | (1A, 2A) |
| 2 | 1 | (1E, 2E) |
| 2 | 2 | (1F, 2F) |
| 2 | 3 | (1G, 2G) |
| 2 | 4 | (1G, 2F) |
| 2 | 5 | (1F, 2E) |
| 2 | 6 | (1E, 2G) |

Fig. 3A

| Time Block | Packet No. | SD Pair & Key Combinations |
|---|---|---|
| 1 | 1 | (1A, 2B, Key #1) |
| 1 | 2 | (1C, 2A, Key #1) |
| 1 | 3 | (1A, 2C, Key #1) |
| 1 | 4 | (1B, 2B, Key #1) |
| 1 | 5 | (1C, 2C, Key #1) |
| 2 | 6 | (1A, 2A, Key #1) |
| 2 | 1 | (1E, 2E, Key #1) |
| 2 | 2 | (1F, 2F, Key #1) |
| 2 | 3 | (1G, 2G, Key #1) |
| 2 | 4 | (1G, 2F, Key #1) |
| 2 | 5 | (1F, 2E, Key #1) |
| 2 | 6 | (1E, 2G, Key #1) |

Fig. 3B

| Time Block | Packet No. | SD Pair & Key Combinations |
|---|---|---|
| 1 | 1 | (1A, 2B, Key #1) |
| 1 | 2 | (1C, 2A, Key #2) |
| 1 | 3 | (1A, 2C, Key #3) |
| 1 | 4 | (1B, 2B, Key #4) |
| 1 | 5 | (1C, 2C, Key #5) |
| 2 | 6 | (1A, 2A, Key #6) |
| 2 | 1 | (1E, 2E, Key #7) |
| 2 | 2 | (1F, 2F, Key #8) |
| 2 | 3 | (1G, 2G, Key #9) |
| 2 | 4 | (1G, 2F, Key #10) |
| 2 | 5 | (1F, 2E, Key #11) |
| 2 | 6 | (1E, 2G, Key #12) |

Fig. 3C

SECURITY THROUGH MANIPULATION OF VIRTUAL TOPOGRAPHY

FIELD OF THE INVENTION

The field of the invention is network security.

BACKGROUND OF THE INVENTION

When sending a data object from one node on a network to another it is common practice to break the data object up into smaller pieces at a sending node and to have the sending node send each piece across the network in a data block portion of a packet. Such a packet typically also includes a header that contains an identifier identifying a destination node and often an identifier identifying the sending/source node as well. As an example, a node using IP packets to send a data object to another node will often break the data object up into an ordered set of packets where each packet comprises a data block portion containing a piece of the data object, and a header portion the contains both a source IP address and a destination IP address. The phrase "ordered set of packets" is used herein to denote any set of packets used to transmit a data object between nodes such that the contents of all of the data packets is necessary to reconstruct the data object at a receiving node. It is a set in the sense that all the packets are necessary to recreate the data object, and ordered in the sense that the contents of the packets must be ordered in a particular way to recreate the data object. In some instances multiple data objects may be transmitted via a single ordered set of packets.

Unfortunately, the inclusion of source and destination identifiers in packet headers provides a mechanism by which an entity that monitors the flow of packets across a network can identify nodes and possibly reconstruct the topology of the network. Having their identifiers known raises security concerns for the nodes as the identifier can be used to send packets to the node and possibly to gain access to the node.

SUMMARY OF THE INVENTION

The present invention is directed to methods and apparatus for improving security securing networks through manipulation of virtual topography.

It is contemplated that security can be enhanced by manipulating the identifiers used by nodes to receive packets and the identifiers that nodes use in packet headers of packets being sent. Although applicable anywhere an identifier (ID) is used, focus will be given primarily to three particular identifiers that will be referred to as the node identifier, the source identifier, and the destination identifiers. The node identifier (NID) is an identifier that a particular node looks for when observing packets being transmitted on a network to determine if a particular packet is being sent to the node. The source (SID) identifier is an identifier that the node uses when sending packets having a header that contains a source identifier, and the destination identifier (DID) is an identifier that the node uses when specifying the destination of a packet. In previously known networks a node will often be assigned a single identifier and will use that identifier as both the node identifier and the source identifier.

It is contemplated that each node will be assigned a set of NIDs, a set of SIDs, and a set of DIDs for use in sending and receiving packets, and will also be provided with a set of rules, a table, or some other ID determination mechanism (IDDM) by which the node can determine which IDS are to be used at a particular time. The node will then proceed to use the IDDM to vary the SIDs and DIDs of packets it sends and the NID or NIDs it uses in filtering received packets.

It is contemplated that the methods and apparatus described herein may be advantageously applied to IP networks where the NIDs, SIDS, and DIDs are IP addresses used to send and receive IP packets.

It is contemplated that IDDMs may employ various methods, but that in some instances it will be advantageous to utilize tables specifying sequences of NIDs and sequences of pairs of SIDs and DIDs.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 1E is a schematic view of a first possible apparent topology of a network having multiple nodes assigned multiple identifiers.

FIG. 1F is a schematic view of a second possible apparent topology of a network having multiple nodes assigned multiple identifiers.

FIG. 1G is a schematic view of a network having the apparent topology of FIG. 1E.

FIG. 1H is an ID relationship table showing the relationships between nodes, NIDs, SIDS, and DIDs for the network and packets of FIG. 1G and the apparent topology of FIG. 1E.

FIG. 1I is a an ID relationship table corresponding to the apparent topology of FIG. 1F.

FIG. 1J is a schematic view the apparent topology of the network of FIG. 1A when NN SIDs are in use.

FIG. 1K is a schematic view of the apparent topology of the network of FIG. 1A when all nodes use NN SIDs.

FIG. 1L is a schematic of an apparent topology achievable by combining the assignment of multiple identifiers to nodes and the use of NN SIDs by the nodes.

FIG. 1M is a schematic of an apparent topology achievable by combining the assignment of multiple identifiers to nodes and the use of NN SIDs by the nodes.

FIG. 3A is a table illustrating a possible acceptable sequence of SD Pairs that may be required to be used for packets to be accepted at a destination node.

FIG. 3B illustrates the use of a source key with a sequence of SD Pairs to validate packets.

FIG. 3C illustrates the use of a possible acceptable sequence of SD Pair/Key combination that may be required to be used for packets to be accepted at a destination node.

DETAILED DESCRIPTION

Figure 1A:
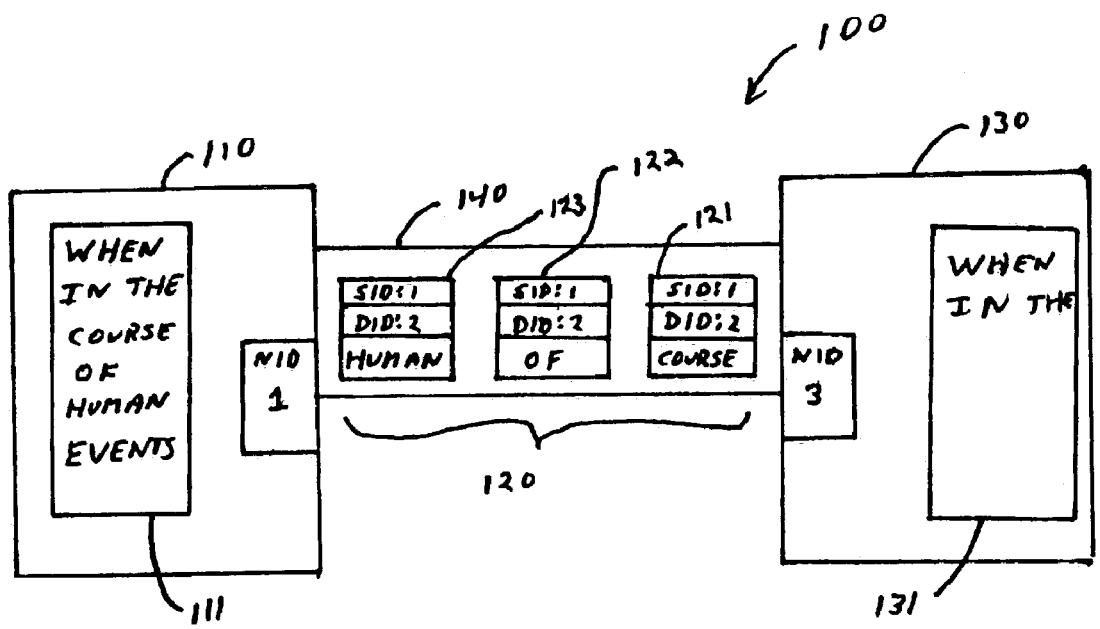
FIG. 1A is a schematic view of a network.

Referring to FIG. 1A, network 100 comprises node 110 sending a copy of data object 111 (a file containing the text of the Declaration of Independence) as an ordered set of packets 120 (some of which have already been received by node 130) to node 130 where the packets are being reassembled as data object 131. The node ID (NID) of node 110 in FIG. 1 is "1" and the NID of node 130 in FIG. 1 is "3". Each packet (121-123) of the set of packets 120 comprises a header having both a source ID (SID) and a destination ID (DID) which are equivalent to the NIDs of nodes 110 and 130. Nodes 110 and 130 are coupled together via transmission medium 140.

Figure 1B:
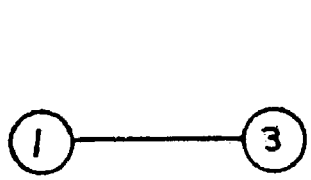
FIG. 1B is a schematic view of the apparent topology of the network of FIG. 1A.

The topology of network 100 can be determined by monitoring packets transmitted via medium 140 from the SIDs and DIDs of the transmitted packets. FIG. 1B is an illustration of what that topology would look like where a circle is assigned to each SID and DID seen, and lines are drawn between circles to indicate that SID/DID pairs seen in monitored packets. Thus, in FIG. 1B, the circles indicated that SID/DID values of "1" and "3" are visible, while the line indicates the SID/DID pair that is visible.

It is contemplated that security could be improved by assigning a plurality of NIDs to a node such that the packets addressed with any of the currently assigned NIDs will be routed to received by the node. The phrase "received by the node" is used herein to mean that not only will the packet physically reach the node but that the node will be programmed or otherwise adapted to recognize that it should perform further processing on any packets having a DID equivalent to a currently assigned NID.

Figure 1C:
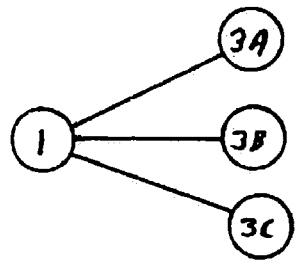
FIG. 1C is a schematic view of the apparent topology of a network having a node assigned multiple identifiers.
Figure 1D:
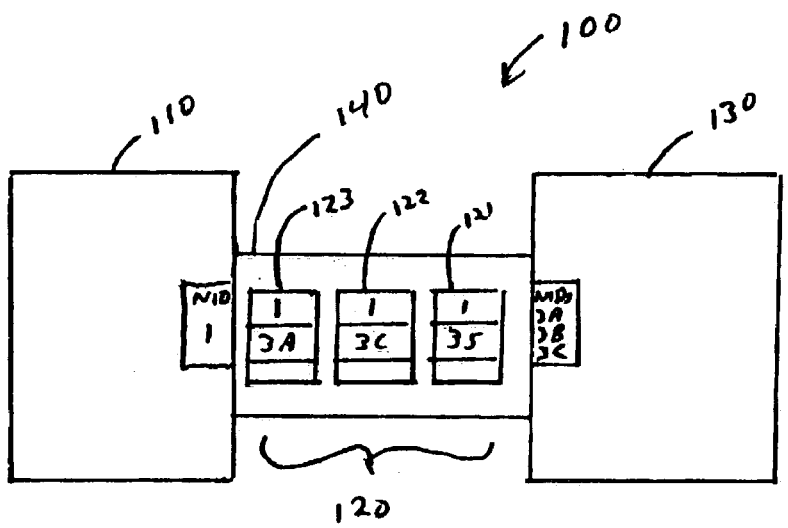
FIG. 1D is a schematic view of a network having the apparent topology of FIG. 1C.

FIG. 1C illustrates the apparent topology of network 100 if node 130 is assigned a plurality of NIDs (3A, 3B, and 3C), and node 110 uses all of the assigned NIDs to send packets to node 130 as illustrated in FIG. 1D. The elements of FIG. 1D correspond to those of FIG. 1A with the primary changes being in the SID and DID pairs (SD Pairs) of packets 121-123 and the NIDs of node 130. Elements 111 and 131 and the data block contents of packets 121-123 were left out of FIG. 1D to simplify the presentation.

It is contemplated that security could be further improved by assigning a plurality of NIDs to all the nodes. FIG. 1E illustrates a possible apparent topology of network 100 if both node 110 and node 130 are assigned a plurality of NIDs (1A, 1B, 1C, 3A, 3B, 3C), and node 110 uses all of the assigned NIDs to send packets to node 130 as illustrated in FIG. 1G. As with FIG. 1D, FIG. 1G provides a simplified view of the network of FIG. 1A wherein the only difference is in regard to the NIDs assigned to the nodes and the SD Pairs used by packets 121-123. FIG. 1F shows an alternate apparent topology if all possible SD Pairs are used.

FIGS. 1H and 1I are ID relationship tables that illustrate the relationships between the nodes and various IDs for each of the packets sent across the network where table 1H corresponds to the topology of FIG. 1E and table 1I to the topology of FIG. 1F. It is important to note that someone observing packets being transmitted be able to recreate; at most, the SID and DID columns of the packets.

It is contemplated that security could also be improved by having a node use SIDs in packets it sends that do not correspond to any NIDs assigned to the node. As an example, if node 110 of FIG. 1A used "2" as the SID in any sent packets, the apparent topology of network 100 would be that shown in FIG. 1J rather than that of FIG. 1B. By using SIDs that aren't NIDs, the actual NIDs of the source node of the packets will not be visible to anyone seeing the SIDs and DIDs of the packets.

It is contemplated that security could be further improved by having all nodes that send packets use SIDs that do not correspond to any assigned NIDs. As an example, if node 110 of FIG. 1A had a NID of "1" and used "2" as the SID of any sent packets, and node 130 of FIG. 1A had a NID of "3" and used a "4" as the SID of any sent packets, the apparent topology of network 100 would be that shown in FIG. 1K rather than that of FIG. 1B or 1J. By having all nodes use SIDs that aren't NIDs, the fact that any two nodes are exchanging packets is hidden.

Figures 1N, 2A, 2B:
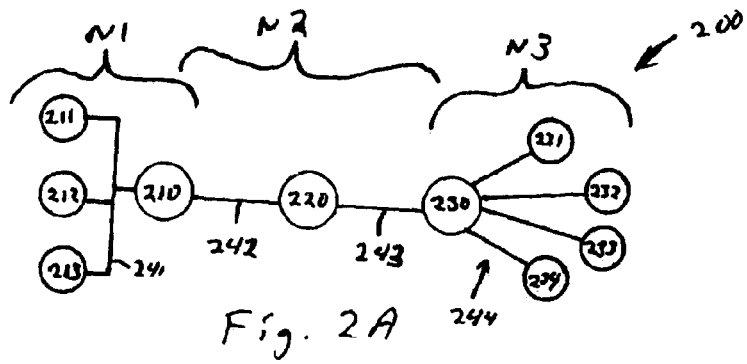
FIG. 1N is an ID relationship table corresponding to FIG. 1L.
FIG. 2A is a schematic view of a network comprising an intermediary routing node acting as a hub for communications between end routing nodes.
FIG. 2B is a table illustrating a possible set of SD Pairs used to transmit a packet across multiple segments of a network using encapsulation, NN SIDS, and nodes assigned multiple NIDs.

It is contemplated that security could be further improved by both using non-NID SIDs (NN SIDs), and assigning and using multiple NIDs to nodes to be used as DIDs on any packets sent to those nodes. Such use would allow one to create the appearance of any topology desired with FIGS. 1L and 1M illustrating two of the many possible topologies. FIG. 1N provides an ID relationship table corresponding to FIG. 1L. Once again, the only portion of the table of FIG. 1L that is visible to someone examining packets are the SID and DID columns showing the SD Pairs of the packets.

It is contemplated that further security improvements can be obtained by utilizing an intermediary routing node and encapsulation to exchange packets between end routing nodes. FIG. 2A illustrates the physical/actual topology of a network comprising two end routing nodes, 210 and 230, and one intermediary routing node 220. End routing nodes 210 and 230 act to couple sub-networks N1 and N3 to each other via network N2. In a preferred embodiment networks N1 and N3 will be private sub-networks while network N2 is a public network such as the Internet. If node 211 sends a packet to node 234, routing node 210 will encapsulate it an send it to intermediate routing node 220. Intermediate routing node 220 will then strip the encapsulating packet off, and re-encapsulate and send the original pack sent by node 211 on to routing node 230. Routing node 230 will then strip off the encapsulating packet and send it on to node 234. As such, the original packet from node 211 would comprise the SD Pair (211,234) in its header as it traverses segment 241. Once encapsulated by node 210, the packet encapsulating the original packet would have an SD Pair of (210, 220) if NN SIDs aren't used, and only a single NID is assigned to each routing node as it traverses segment 242. Once re-encapsulated, the packet encapsulating the original packet would have the SD Pair (220, 230) as it traverses segment 243. Finally the original packet with the SD Pair (211, 234) would traverse segment 244 to reach node 234.

Simply forcing all traffic passing between nodes 210 and 230 to pass through node 220 provides a security enhancement (assuming the headers of any encapsulated packets are encrypted in some fashion) as anyone viewing packets traversing segment 242 or segment 243 will only have visibility to the SD Pairs used on those segments. If nodes 210, 220, and 230 are assigned multiple NIDs and if NN SIDs are used, the benefits described above come in to play as well. As an example, if node 210 were pictured as being in the position of node 110 of network 100, and node 220 is the position of node 130, then the SD Pairs of encapsulating packets traversing segment 242 could be manipulated to give the apparent topology of FIGS. 1L, 1M, or some other desired topology.

When using routing nodes and encapsulation, an ordered set of packets may comprise all the packets sent through a particular "tunnel" during a given time period and thus may comprise packets that when reassembled make up a plurality of data objects.

FIG. 2B is a table showing a possible set of SD Pairs used to transmit packets from node 211 to node 234 across network 200 if: node 210 is assigned NIDs 1A, 1B, and 1C but uses SIDs 2A, 2B, and 2C when communicating with node 220; node 220 is assigned NIDs 3A, 3B, and 3C for use on segment 242 but uses SIDs 4A, 4B, and 4C when communicating with node 210; node 220 is assigned NIDs 5A, 5B, and 5C for use on segment 243 but uses SIDs 6A, 6B, and 6C when communicating with node 230; and node 230 is assigned NIDs 7A, 7B, and 7C but uses SIDs 8A, 8B, and 8C when communicating with node 220.

In preferred embodiments a set of ordered packets will comprise IP packets being transmitted between private sub-networks across the internet. Using network 200 as an example, nodes 210, 220, and 230 could be routers coupled to the Internet via one or more network interface (NIC) cards. Each NIC card of the routers could be programmed to accept packets addressed with any one of a set of DID/IP addresses. A sending router could utilize any one of the IP Addresses currently assigned to the destination router. It is contemplated that there may be some intermediate routers located between nodes 210 and 220 and/or between nodes 220 and 230. In some instances it may be feasible to dynamically update the routing table of such routers to properly route packets using the IP addresses currently assigned to the nodes. However, it is contemplated that it may be better to simply set up the routing tables of such routers such that any one of a large set of IP addresses will be properly routed to a node and then to simply allow the node to determine which packets it will pay attention to at any particular time as will be described below.

It is contemplated that further security improvements can be obtained by adapting nodes to only accept packets that have particular SD Pairs, and to vary the list of acceptable SD Pairs over time. Acceptance of SD Pairs may also be limited in regard to the order they are used. Acceptance may further be conditioned on the packet comprising an additional key value that validates the authenticity of the packet. In instances where packets will traverse a public network and their order of arrival cannot be relied upon it would be advantageous to utilize adapt a particular node to accept any one of an acceptable combination of IDs and/or keys., FIG. 3A provides a table that might be provided to each of two nodes with one node using the table to set SD Pairs on outgoing packets and the other node to determine whether incoming packets should be accepted or discarded. As such, packets sent during first time block may be assigned SD Pairs in the following sequence: (1A, 2B), (1C, 2A), (1A, 2C), (1B, 2B), (1C, 2C), (1A, 2A), (1E, 2E), (1F, 2F), (1G, 2G), (1G, 2F), (1F, 2E), (1E, 2G). It is contemplated that assigning SD Pairs in a particular order eliminates the need for a separate sequence number such that a set of ordered pairs used to transmit a file or other data object can be sent and reassembled using only the SD Pairs of the packets. Alternatively, the inclusion of a sequence number or other order identifier would permit the reuse of SD Pairs within a time block.

In some instances it may be desirable to include another level of security by including a key in any packets set. Such a key might be part of the data block or the header of such packets and may be assigned in any manner as long as the receiving node is able to determine which packets comprise valid SD Pair and key combinations and which do not. Two of the many possible key assignment schemes possible are illustrated in FIGS. 3B and 3C. In FIG. 3B, a key is assigned to a particular node such that every packet sent by that node comprises its key (which may also be changed over time and/or in accordance with a key maintenance scheme). In such an instance a receiving node will not only verify that any received packet comprises a valid SD Pair, but that it also comprises a key from a known source In FIG. 3C, a separate key is assigned to each packet such that packet validation requires the packet comprise an acceptable combination of SD Pair and key.

It should be noted that, although no other nodes are shown in the figures, in reality one observing a segment of a public network would likely see packets from a large number of sub-networks traversing the segment with the extra traffic across the segment making it even more difficult to identify packets of interest and to determine how such packets have to be grouped to reassemble the file or other data object being sent. However, it is contemplated that further security can be provided by having a node send dummy packets, i.e. packets that do not comprise information being protected, and/or packets that do not comprise a valid SD Pairs or SD Pair/Key combination.

It is contemplated that in some instances the packets of an ordered set of packets comprising the contents of a data object may be split among multiple segments. As an example, a sub-network might: comprise multiple links to a public network in which case the packets of the ordered set could be divided among the links for transmission.

It should be readily apparent that the methods and systems described herein are not limited to a particular type of network, the use of a particular type of protocol, or the use of a particular transmission medium. As such, they are equally applicable to wired and wireless regardless of the physical topology or protocols used. However, it is contemplated that the methods and systems herein are particularly well adapted for use on TCP/IP networks. In such instances, assigning multiple IP addresses to NIC cards, manipulating the source and destination IP addresses used in the IP header of any packets sent, and/or validating incoming packets based on the source and destination IP addresses and possibly a key included in the packet provide a method of transmitting data order sets of packets that is more secure than transmission when such steps are not taken.

Thus, specific embodiments and applications of security methods and systems have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of sending a set of ordered packets composing a single stream to a destination comprising:
   associating a set of destination identifiers with a destination;
   providing a set of ordered packets to be sent to the destination;
   assigning each of the ordered packets a destination identifier from the set of destination identifiers wherein at least two packets of the set are assigned different destination identifiers;
   associating a set of source identifiers with the a source system;
   assigning each of the ordered packets a source identifier from the set of source identifiers wherein at least two packets of the set are assigned different source identifiers; and
   causing the source system to send the packets.

* * * * *